United States Patent
Endress et al.

(10) Patent No.: US 7,567,186 B2
(45) Date of Patent: Jul. 28, 2009

(54) INFORMATION AND NOTIFICATION SYSTEM USING PASSENGER SERVICE UNITS IN AN AIRCRAFT

(75) Inventors: Manfred Endress, Buxtehude (DE); Thorsten Grothkopp, Buchholz (DE)

(73) Assignee: Airbus Deutschland GmbH, Hamburg (DE)

( * ) Notice: Subject to any disclaimer, the term of this patent is extended or adjusted under 35 U.S.C. 154(b) by 1392 days.

(21) Appl. No.: 10/371,488

(22) Filed: Feb. 21, 2003

(65) Prior Publication Data

US 2003/0160706 A1 Aug. 28, 2003

(30) Foreign Application Priority Data

Feb. 22, 2002 (DE) .................. 102 07 641

(51) Int. Cl.
*G08B 21/00* (2006.01)
*G01C 23/00* (2006.01)

(52) U.S. Cl. .......... 340/945; 701/3; 340/286.06; 244/118.5

(58) Field of Classification Search ........... 340/945, 340/973, 286.06, 462; 455/431; 600/27; 345/611; 297/161; 244/118.5, 118.6; 701/3, 701/4
See application file for complete search history.

(56) References Cited

U.S. PATENT DOCUMENTS

| | | | |
|---|---|---|---|
| 4,975,696 A | | 12/1990 | Salter, Jr. et al. |
| 5,555,458 A | * | 9/1996 | Large .................... 340/945 |
| 5,556,332 A | * | 9/1996 | Schumacher ............ 454/76 |
| 5,651,733 A | | 7/1997 | Schumacher |
| 5,784,018 A | * | 7/1998 | Ohmi et al. ............. 341/136 |
| 5,795,018 A | * | 8/1998 | Schumacher et al. ... 297/184.17 |
| 5,811,791 A | * | 9/1998 | Portman ................. 250/221 |
| 5,910,814 A | | 6/1999 | Portman et al. |
| 5,984,415 A | * | 11/1999 | Schumacher et al. ..... 297/411.2 |
| 6,177,887 B1 | * | 1/2001 | Jerome ................... 725/76 |
| 6,393,343 B1 | | 5/2002 | Frey et al. |
| 6,454,209 B1 | | 9/2002 | Bock et al. |
| 6,507,952 B1 | * | 1/2003 | Miller et al. ............. 725/76 |
| 6,619,716 B1 | * | 9/2003 | Sturt ...................... 296/37.8 |
| 6,633,347 B2 | * | 10/2003 | Kitazawa ................ 348/837 |
| 7,135,974 B2 | * | 11/2006 | Hernandez et al. ....... 340/572.1 |
| 7,379,125 B2 | * | 5/2008 | Chang .................... 348/837 |
| 2004/0212746 A1 | * | 10/2004 | Rosen ..................... 348/837 |

FOREIGN PATENT DOCUMENTS

| | | |
|---|---|---|
| DE | 3426893 | 1/1986 |
| DE | 34 44 802 | 6/1986 |
| DE | 197 08 764 | 11/1997 |
| DE | 197 05 643 | 8/1998 |
| GB | 2 168 880 | 6/1986 |

* cited by examiner

*Primary Examiner*—Benjamin C Lee
*Assistant Examiner*—Sigmund Tang
(74) *Attorney, Agent, or Firm*—W. F. Fasse; W. G. Fasse

(57) ABSTRACT

An information and notification system onboard an aircraft includes a databus that receives information transmitted from outside the aircraft via an interface and a director or control unit, as well as information from onboard data storage units via a flight attendant panel, whereby the information content can be selected, changed, and controlled. The databus may be a hard-wired or wireless databus, by which the information is provided to variable universal notification displays incorporated in passenger service units in the passenger cabin. The display can thus provide variable and selectable information content for the passengers.

11 Claims, 4 Drawing Sheets

INFORMATION AND NOTIFICATION SYSTEM USING PASSENGER SERVICE UNITS IN AN AIRCRAFT

PRIORITY CLAIM

This application is based on and claims the priority under 35 U.S.C. §119 of German Patent Application 102 07 641.3, filed on Feb. 22, 2002, the entire disclosure of which is incorporated herein by reference.

FIELD OF THE INVENTION

The invention relates to an information and notification system using passenger service units in a passenger aircraft.

BACKGROUND INFORMATION

It is conventionally known to arrange service units, so-called PSUs (passenger service units), above the passenger seats (e.g. on the bottom of the overhead baggage compartments) in the passenger cabin of an aircraft. These passenger service units make various service and information functions available to the passengers. For example, reading lamps, flight attendant call buttons instructional signs, and loudspeakers are integrated into the passenger service units. Such passenger service units including informational units are known, among other things, from the German Patent Publication DE 34 26 893 A1.

The previously known passenger service units have included signs or the like that are able to display fixed invariable information to the passengers. For example, such signs usually include a "fasten seatbelt" sign and a "no smoking" sign. Such fixed invariable signs are embodied with printed sign plates or plaques that can be selectively back-lighted in the installed condition in the passenger service unit. The back-lighting is typically provided by incandescent lamps or light emitting diodes (LEDs). In any event, the back-lighting can simply be either switched on or switched off, to selectively display or not display the fixed instruction provided by the respective sign, such as "fasten seatbelt" or "no smoking" in text and/or symbolic images. It is disadvantageous that the instructional content of the signs is not changeable or variable, or if at all, can only be changed by physically exchanging the entire notification module or at least the printed sign plates. As a result, the available display area of the PSU can only be used for selectively displaying the two fixed invariable signs (e.g. "no smoking" and "fasten seatbelt")

If it is desired to display other or additional informative or entertaining content (for example flight altitude, remaining flight time, connecting flight information, money exchange rates, weather forecasts or reports, etc.), it has been necessary to install relatively complex information systems, such as inflight entertainment (IFE) systems or passenger flight information systems (PFIS). These systems require a very large financial investment by the airline for equipping the aircraft, and comprise relatively heavy components which thus cause a constant weight penalty in the loading of the aircraft. For example, these systems comprise audio and video tape players or reproducers, cassette stowage units, and various control devices. It is also necessary to install additional display screens in the cabin, which also causes a space penalty for the available passenger space.

In many cases such systems are over-dimensioned, or simply provide more informational capabilities than are required. For example, on short-haul flights, there is often barely time to sensibly utilize such a system. Moreover, relatively small commercial aircraft are typically used for such short-haul flights, and the additional weight and space penalty of such known information systems lead to a significant reduction of the total available load capacity, which leads to an economic penalty in the operation of the aircraft. It is thus essentially not economically possible to utilize such complex inflight entertainment systems with additional monitors and relatively heavy devices and components in such situations, e.g. short flights or relatively small aircraft.

SUMMARY OF THE INVENTION

In view of the foregoing it is an object of the invention to provide an information and notification system with a display device to be arranged in a passenger cabin to provide informative and/or entertaining content to the passengers and the crew, while avoiding the above described disadvantages. Particularly, it is an object of the invention to provide flexible or variable information content, to considerably improve the comfort of the passenger and to facilitate the work or reduce the work burden for the flight attendant crew during a flight, while avoiding relatively heavy components and additional video monitors or the like. The invention further aims to avoid or overcome the disadvantages of the prior art, and to achieve additional advantages as apparent from the present specification.

The above objects have been achieved according to the invention in an aircraft having a passenger service unit arranged in a passenger cabin, wherein a universal variable notification display (called notification display herein) for the flexible display of variable informational content is integrated in the passenger service unit. The notification display is connected via a databus system with at least one operating and control unit, which in turn is connected via interfaces with information input devices.

According to further detailed features of the invention, the information input devices may comprise memory or storage media such as CD-ROMS, memory cards, diskettes, and/or USB (universal serial bus) storage or memory devices, as well as interfaces for the wireless transmission of data provided to the aircraft, or interfaces for the transmission of data from the avionics system of the aircraft. The wireless transmission link may involve transmission systems between the ground (i.e. the earth) and the aircraft, e.g. ACARS, or satellite transmission links such as SATCOM communication links.

Furthermore, the databus system and at least one or more parts of the operating and control units are preferably components of a data transmission system already present in the aircraft, and associated components thereof, e.g. making up the cabin intercommunication data system (CIDS) in correspondingly equipped aircraft. The databus system may be embodied as a wire based system, for example according to the RS485 standard, or as a wireless system, such as a wireless LAN (local area network), a Bluetooth system or an infrared system.

The operating and control unit may comprise a computer processing and operating unit that enables a direct input and/or operation thereof via an operating panel and/or via an external connectable keyboard. Furthermore, a monitoring and control unit may be embodied as a single integrated device unit together with the computer processing and operating unit.

The inventive system or arrangement preferably comprises a plurality of the notification displays respectively integrated in plural passenger service units that are arranged proximate and allocated to respective passenger seats throughout the passenger cabin of the aircraft. By means of individual addressing of the informational content, it is possible to control the individual notification displays or the respective information content transmitted or provided thereto, in that the respective information content is referenced to and/or dependent on the particular seat to which it is directed, or the passenger class division, or the like. In other words, different information content can be respectively provided to different notification displays allocated to different passenger seats or different passenger seating classes. It is further possible to provide several available channels or programs of informational content that may be individually selected as desired by the passenger sitting in the seat to which a respective one of the notification displays is allocated.

In its integration in the passenger service unit, the inventive notification display can be combined with otherwise conventional invariable instructional signs, such as a no smoking sign or a fasten seatbelt sign. Alternatively, the notification display may comprise a common display for both the variable information content as well as the instructional signs, which are especially fixed invariable instructional signs (graphic images and/or text messages) being selectively displayed on the display.

With the inventive system, it is especially advantageous, in comparison to the prior state of the art, that it is possible to provide a universal, flexibly variable and adaptable utilization of the available surface area of the passenger service units. In this manner, the invention provides a considerable added value for the passengers, the airlines, and their partners. With the invention, it is no longer necessary to provide additional displays mounted outside of the passenger service units in the passenger cabin of an aircraft. This leads to a considerable reduction of costs, weight, and space consumption. In aircraft with an already existing data transmission system (for example a CIDS—cabin intercommunication data system), it is readily possible to integrate the functionalities of the inventive arrangement into the existing data transmission system, which achieves a further reduction of the total components, weight and investment. In any event, the total system weight and total system costs of the inventive system are considerably reduced in comparison to conventionally known in-flight entertainment systems.

In comparison to the fixed invariable instructional signs (e.g. providing safety related or mandatory passenger instructions), such as the "fasten seatbelt" sign and the "no smoking" sign, on conventional passenger service units, the inventive system provides much greater versatility and a richer, adaptable range of informational content that can be provided to the passengers. For example, through a considerable increase and improvement of the flexible adaptability of the informational content, the display of all information, including the safety related information, can be carried out in multiple languages. Moreover, the visual display of such variable and selectable information is advantageously suitable for assisting passengers who have a hearing deficiency, in obtaining the information content of announcements or the like made by the flight attendants or other crew personnel. It is also possible to provide several different channels of available informational content simultaneously, whereby each respective passenger can select the desired informational channel at any time. This may involve simply selecting the desired language of the information being displayed, or can involve selecting among different types of available information that can be displayed, for example the flight data, weather information, news, arrival gate information, or the like. A further function may override any information selection made by the passenger, when it is necessary to display important safety related notifications, or all-call passenger announcements or the like.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

The inventive information and notification arrangement or system 1 comprises several different components both on the ground and onboard an aircraft, in order to carry out or provide the following functions: inputting and formatting of informational content to be displayed, on the ground and/or onboard a passenger aircraft; interfacing between the inventive system and other aircraft systems, such as the avionics, for example; interfacing between the inventive system and other aircraft systems for transmitting and receiving information from the ground/earth or through the air (e.g. from satellites); storing information content onboard the aircraft; transmitting the information content to several notification displays; displaying the information content on the notification displays; and various possibilities for operating the system and selecting the information content to be displayed.

Due to various different technical conditions or arrangements existing in a particular aircraft, it is necessary to provide various different corresponding embodiments of the information and notification system according to the invention.

Figure 1:
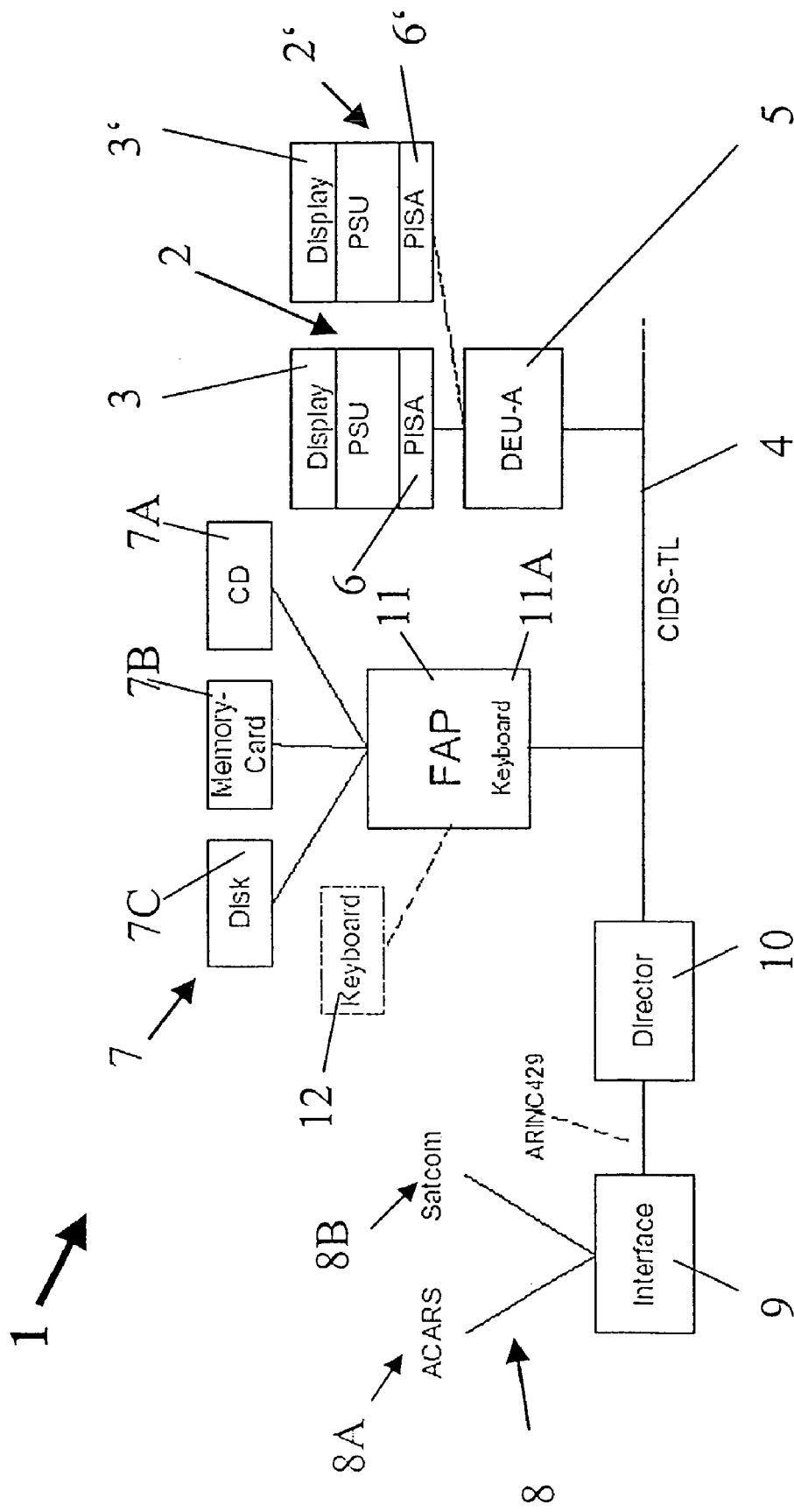
FIG. 1 is a schematic block diagram of the essential components of a first embodiment of an information and notification system according to the invention.

FIG. 1 schematically illustrates a first embodiment of the general structure of the information and notification system 1 according to the invention, whereby this system 1 is integrated into a system that is already present in the aircraft for carrying out passenger related and/or flight attendant related functions, particularly a so-called cabin intercommunication data system (CIDS). Such a system is, for example, generally known from the German Patent Publication DE 34 26 893, and provides certain passenger related functions in the passenger cabin of an aircraft, among other things.

Figure 3:
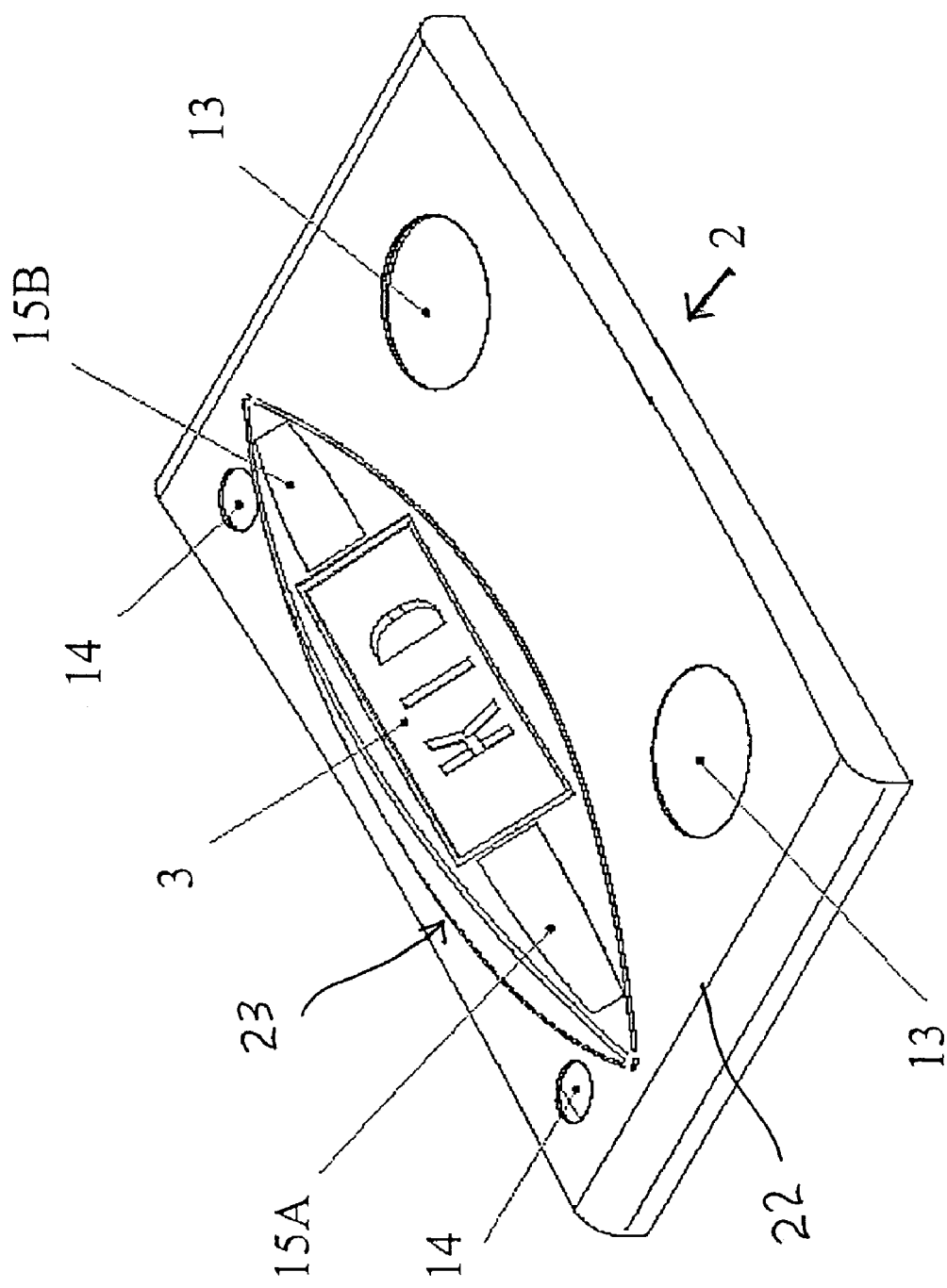
FIG. 3 is a perspective view of a passenger service unit with an integrated notification display of the inventive information and notification system.

In the passenger cabin, service units 2 or 2', so-called passenger service units (PSUs), are arranged typically above the passenger seats. These PSUs provide certain service and information functions for the passenger or passengers seated below the respective PSU. Among other things, reading lamps 13, flight attendant call buttons 14, instructional signs 15A, 15B and loudspeakers are provided in the PSU 2, 2', for example as shown in FIG. 3. Further according to the invention, a respective variable universal notification display 3, 3' is additionally arranged on or integrated into each respective passenger service unit 2, 2'. The notification display 3, 3' is provided as a graphics-enabled display for the flexible or variable display of information thereon. Not only the safety related instructional signs 15A, 15B (such as the no smoking sign and the fasten seatbelt sign), but also various different informative and/or entertaining information contents may be displayed on the respective display 3, 3'. Several possibilities of the particular embodiment or layout of the display, as well as the content of information are shown and described in detail below in connection with FIGS. 4A to 4D.

In this first example embodiment according to FIG. 1, the transmission of information is carried out via a databus system 4, which is already previously installed in the aircraft passenger cabin as a component of or for the use of an existing data transmission system (for example a known CIDS system). This system further includes an addressable decoder-encoder unit 5 (DEU-A) connected between the databus and the PSUs, as well as an interface and supply unit 6, 6' (generally known as a PISA—passenger interface and supply adapter) respectively connected to or provided for each PSU 2, 2'. Particularly, the PISAs are provided as monitoring and control units for the respective allocated service units 2, 2'.

The feeding of information into the system can be carried out either through an airline specific interface or standard interfaces. In this context, the provided information can include information that has been previously stored in a memory or storage medium 7 which may comprise any typical known components or technologies for storing data, including CD-ROMS 7A, memory cards 7B, diskettes 7C, or USB memories or storage drive devices (not shown). Alternatively or additionally, the provided information can include current or real time data generated during a flight, for example arising from the avionics system of the aircraft or being received from the ground to the aircraft via a suitable wireless transmission link 8 (for example ACARS 8A) or via a satellite transmission link (for example SATCOM 8B). The data received in this manner are supplied through a corresponding suitable interface 9 to a director 10 (comprising a central processing computer of the CIDS), and from there are fed into the aircraft-internal databus system 4.

The system further includes an operator panel 11, for example especially a flight attendant panel 11 (FAP) of the CIDS system, optionally in connection with an additional or separate peripheral keyboard 12, or having a touch-sensitive screen 11A acting as an integrated keyboard of the flight attendant panel 11. Thereby, the flight attendants or flight crew of the aircraft can enter selections or other inputs to control the feed of information into the system from the above described information sources, and to select and change the information as desired.

Through the use of the CIDS system it is further possible to display or provide various different information contents dependent on the passenger class or cabin zone. For example, it is possible to display special offers or relevant information for the first-class passengers on the notification displays 3, 3' arranged in the first-class cabin, while simultaneously displaying money exchange rates or other financial information on the notification displays 3, 3' in the business class cabin, while simultaneously displaying general information such as the flight altitude on the notification displays 3, 3' in the economy class cabin.

Further, by providing a suitable addressing mechanism in any conventionally known manner, in connection with the CIDS system, it is possible to provide an individual addressing particular passenger seat or seat group-serviced by a single passenger service unit 2, 2'. Thereby, it is possible to provide an individualized seat-dependent information content to each individual passenger service unit 2, 2'. For example, particular messages or notifications pertinent to a particular passenger, e.g. connecting flight information, in-flight meal selection information, or paging messages, can be displayed on the notification display 3, 3' of the particular passenger service unit 2, 2' allocated to the corresponding passenger's seat. It is further possible, e.g. using a suitable channel selector switch, for the individual passenger to select any desired one of plural available information content channels, to be displayed on the notification display 3, 3' allocated to that passenger or that passenger's seat group. The necessary information regarding the cabin layout and the particular seat assignments is already available in the CIDS system, and can be used directly for the information and notification system as well.

Figure 2:
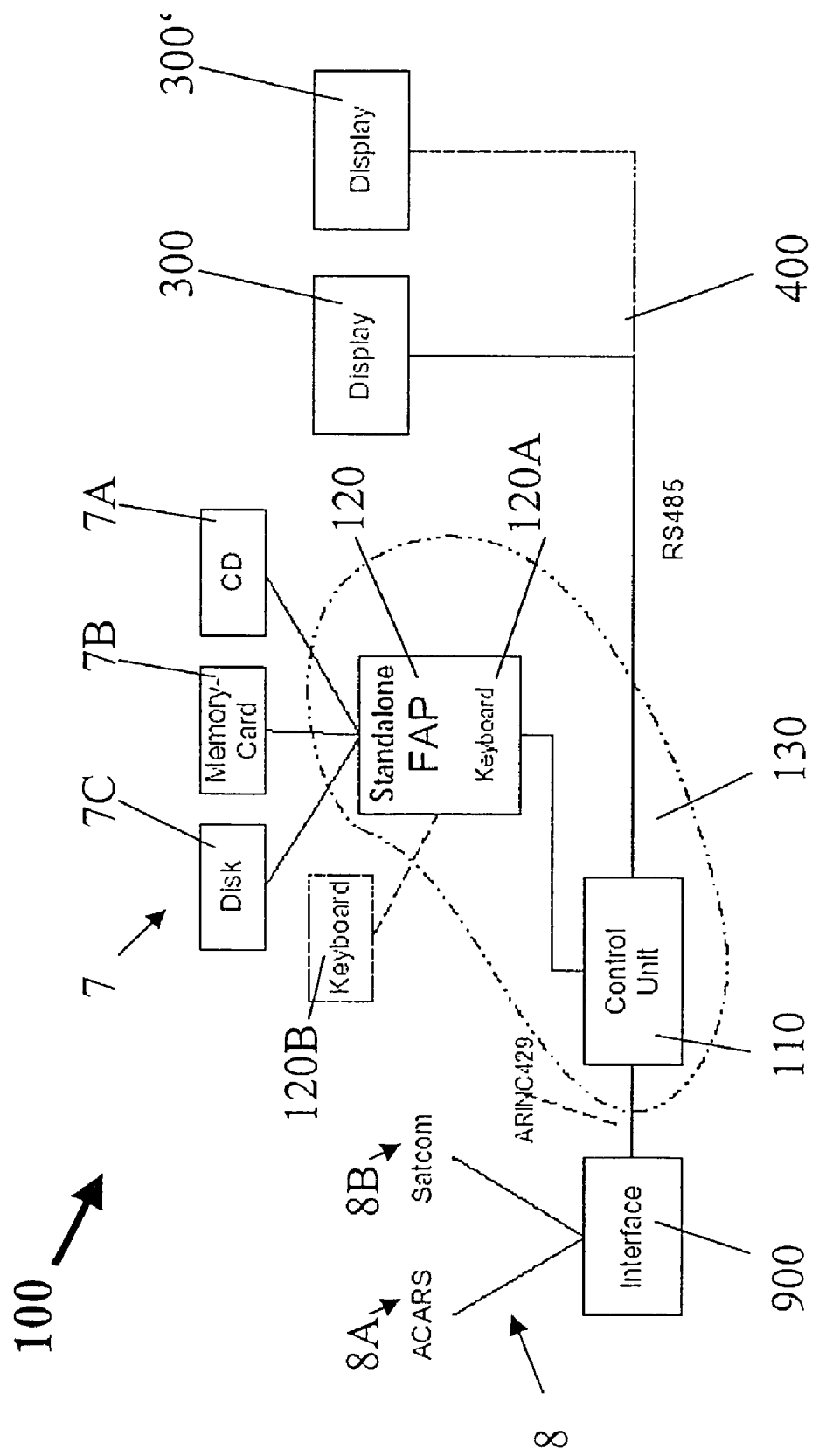
FIG. 2 is a schematic block diagram generally similar to that of FIG. 1, but showing a second embodiment of the inventive information and notification system.

A second embodiment of an information and notification system 100 according to the invention is schematically shown in FIG. 2, whereby the primary essential components of the system 100 correspond to the components of the information and notification system 1 of the first embodiment described above in connection with FIG. 1. Thus, the overall structure and operation of the system 100 according to FIG. 2 can be understood based on the above description of the first embodiment. Especially the differences or particular features of the system 100 in comparison to the system 1 will be described here.

The system 100 according to FIG. 2 is for transmitting data in situations in which it is not possible to use an existing or previously installed data transmission system, such as the so-called CIDS system, in the aircraft, for example in aircraft not equipped with such a CIDS system. Thus, the information and notification system 100 of the present second embodiment includes its own databus system 400, which may be a wire-bound system, for example based on the RS485 standard, or may be a wireless system embodied in any known wireless technology, for example as a wireless LAN, a Bluetooth wireless transmission link, or an infrared wireless transmission link. Thus, while the notification displays 300, 300' are spatially or physically respectively arranged or integrated in the respective passenger service units 2, 2' (see FIG. 3), the information transmission to the notification displays 300, 300' can be carried out independently of the other functions of the service units.

The feeding of information into this system 100 can be carried out, similarly as described above for the system 1, from memory or storage media 7, such as a CD-ROM 7A, memory card 7B, diskette 7C, for example, or via a suitable wireless transmission link 8 such as an ACARS transmission link 8A from the ground to the aircraft or a satellite transmission link such as SATCOM 8B. Furthermore, current or real time data arising during the flight, such as data arising from the avionics system of the aircraft, can be fed into the information and notification system 100. The various above described data are supplied through a corresponding suitable interface 900 to a control and monitoring unit 110, and from there are fed into the aircraft-internal databus system 400.

A selection, change, and feeding of information, or a possible allocation of the information to different passenger class divisions or the like, as described above in connection with the first embodiment, is carried out by means of a computer processing and operating unit 120 and/or the control and monitoring unit 110. An individual addressing of the passenger seats and therewith a flexible or variable allocation of the information content to be displayed for each respective seat is possible when using a suitable addressing mechanism. The computer processing and operating unit 120 is especially embodied as a stand alone flight attendant panel (FAP) 120, which may include an integrated touch-sensitive screen or the like as an operator panel keyboard 120A and/or an additional separate peripheral keyboard 120B. Through these means, the manual configuration, selection, and operation of functions of the system can be carried out already on the ground or during the flight by the flight attendants or other flight crew personnel. Preferably, the control and monitoring unit 110 and the computer processing and operating unit 120 are integrated or combined to form a single integrated device unit 130.

FIG. 3 is a schematic perspective view of a service unit 2, also particularly called a PSU (passenger service unit) 2. Note that this illustration is, in effect, "upside down", because the PSU 2, 2' is typically installed above the passengers, facing downwardly from the bottom of the overhead baggage compartments. According to the invention, the notification display 3, 3', 300, 300' of the inventive information and notification system 1 or 100 is integrated into such a passenger service unit 2. The notification display 3, 3', 300, 300' is provided instead of or in addition to the previously conventionally used back-lighted sign plates or placards for the instructional signs "fasten seatbelts" and "no smoking". In the illustrated example embodiment of FIG. 3, the notification display 3 is arranged centrally in an information module or area 23 that protrudes downwardly from the housing 22 of the service unit 2, while separate instructional signs 15A and 15B for the passenger instructions "fasten seatbelt" and "no smoking" are arranged to the left and the right next to the display 3. Furthermore, reading lamps 13, flight attendant call buttons 14, and/or any other conventionally known components of a PSU are integrated into the service unit 2.

In this embodiment, the instructional signs 15A and 15B are fixed invariable signs bearing prescribed passenger instructions or directions such as "fasten seatbelt" and "no smoking" in text and/or graphical images or symbols. In a generally conventionally known manner, these instructional signs 15A and 15B may be selectively back-lighted to be selectively switched on or switched off, while the printed information remains fixed or invariable. On the other hand, the notification display 3 is a fully variable or universal display, that can display any form and content of information provided to this display, for example in the manner of pixels using any conventionally known display technology. In this context, however, it must be considered that the information needs to be readable under the lighting conditions existing in the aircraft cabin. In any event, the display 3 may be a monochrome or a multi-color display. The display can be a text display, a graphic display, or a combination of both. In view of today's technology, the display may be embodied as a liquid crystal display (LCD), a vacuum fluorescence display (VFD), a flexible liquid crystal display, a micro-display, a light emitting diode (LED) display, an organic light emitting diode (OLED) display, a thin film transistor (TFT) display, or a field emitting display (FED).

In order to provide a sufficient contrast, visibility, readability, and signaling ability to attract the attention of a passenger, the display or the background illumination is preferably selectively dimmable, to either increase or decrease the illumination brightness of the display and/or the background. The signaling effect to attract the attention of a passenger can be increased by inverting the dark and light portions of the image, by blinking or flashing the background illumination, or by providing a different coloring of the background illumination. The information displayed on the display 3 can be in the form of text, graphic images, or a combination of text and graphic images, whereby the text and/or images can be displayed in fixed frames that change every few seconds, or the text and/or images can scroll horizontally or vertically across the screen area of the display, for example in the manner of a simple ticker-tape display.

Figure 4A:
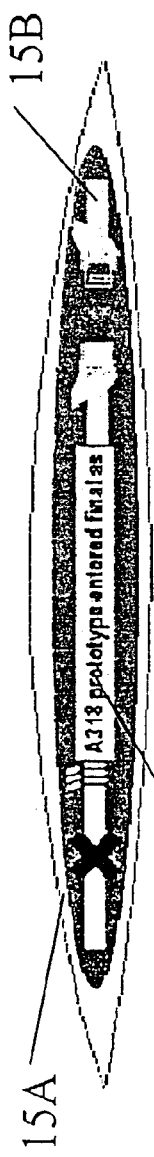
FIG. 4A is a schematic illustration of a combination of instructional signs together with a variable universal notification display on a single line.
Figure 4B:
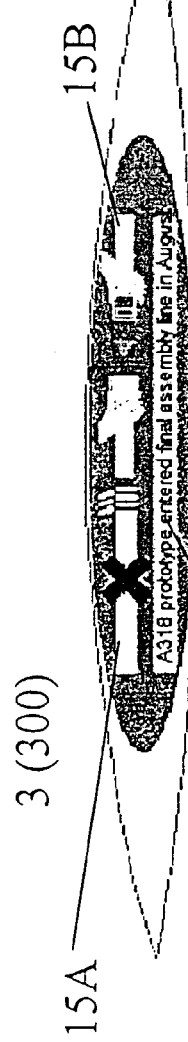
FIG. 4B is a schematic illustration of a combination of instructional signs and a variable universal notification display on two lines, one above the other.
Figure 4C:
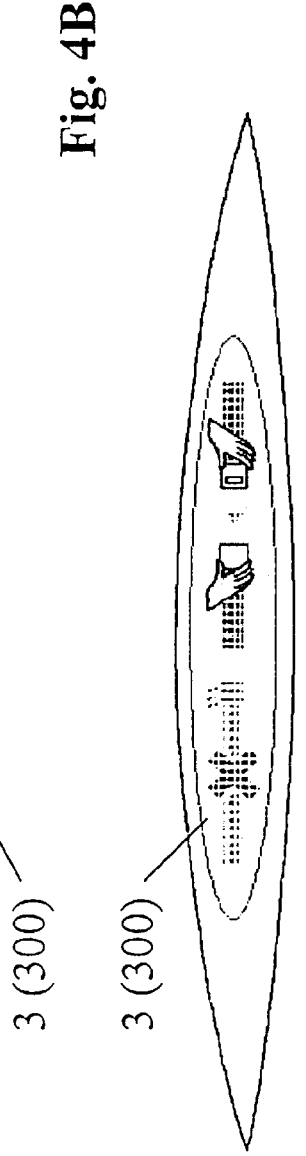
FIG. 4C is a schematic illustration in which the instructional sign information is displayed directly on a variable universal notification display.
Figure 4D:
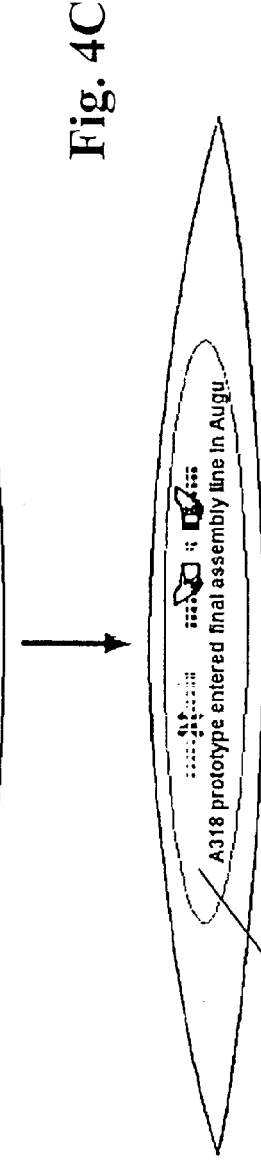
FIG. 4D is a schematic illustration of a variable universal notification display that is displaying both instructional sign information and a variable text information on a line below the instructional sign information.

FIGS. 4A to 4C show various different arrangements or embodiments of the notification display 3, 300. For example, FIGS. 4A and 4B show two configurations similar to FIG. 3, wherein the variable or universal notification display 3, 300 is provided in addition to fixed invariable instructional signs 15A and 15B. In FIG. 4A, a notification display 3, 300 suitable for displaying a single line of text in ticker format is arranged between a "no smoking" instructional sign 15A and a "fasten seatbelt" instructional sign 15B. In FIG. 4B, a single text line display 3, 300 is arranged below the fixed invariable instructional signs 15A and 15B. On the other hand, FIGS. 4C and 4D show embodiments in which the typical instructional messages or symbolic images "no smoking" and "fasten seatbelt" are incorporated or displayed on the common universal display 3, 300, whereby it is not necessary to provide a separate fixed invariable instructional sign 15A, 15B for these instructions. In FIG. 4D, additional notification messages are provided as a line of text below the instructions "no smoking" and "fasten seatbelt". Alternatively, as shown in FIG. 4C, it is possible to switch between a display of the instructional signs or messages and other notifications or information. In other words, whenever necessary the safety related instructional signs or messages are displayed on the display 3, while at other times any desired notifications or information may be displayed on the display 3.

It should be apparent, that the information to be displayed on the display 3, 300 can take any desired form, in the manner of text, graphic images, symbols or the like. As particular examples, the typical safety related signs "fasten seatbelt" and "no smoking" can be displayed on the notification display 3, 300, but any other desired informative or entertaining information content can be displayed thereon. Examples of the possible information, which may be provided on separate channels, for example, include: flight information such as the flight altitude, remaining flight time, estimated time of arrival at the destination, outside air temperature, name of the flight crew personnel, information regarding the particular aircraft, etc.; safety information; advertisements and special offers presented by the airline and the airline's partners; current information such as news, sports information, money exchange rates and financial data, weather reports and forecasts, etc.; airport information; gate information regarding connecting flights and departure times as well as gate changes; current important announcements or notifications regarding the flight or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft having a passenger cabin and plural passenger service units arranged facing downwardly from a bottom of overhead baggage compartments above plural passenger seats in said passenger cabin, wherein each said passenger service unit is an integrated unit including a unit housing and at least one passenger reading lamp arranged in or on said unit housing;

an improvement comprising a passenger information and notification system that comprises:

plural universal notification displays, wherein a respective one of said universal notification displays is respectively integrated in each respective said passenger service unit by being arranged in or on said unit housing of said respective passenger service unit that is arranged facing downwardly from said bottom of said overhead baggage compartments, and wherein each said universal notification display is adapted to display a variable information content including text and/or graphic images;

a databus system connected to said universal notification displays and adapted to transmit the variable information content respectively and selectively to said universal notification displays;

information input devices that provide the variable information content; and an operating and control arrangement that is connected to said information input devices and to said databus system, and that is adapted to select and control the variable information content from the information input devices and to provide the selected variable information content via said databus system to said universal notification displays to be displayed thereon, wherein said operating and control arrangement includes an addressing arrangement adapted to provide different selected variable information content to different ones of said universal notification displays dependent on a particular passenger seat and/or group of passenger seats and/or a passenger class to which each said universal notification display is respectively assigned by individually addressing said different selected variable information content.

2. The improvement in the aircraft according to claim 1, wherein said aircraft has a cabin intercommunication data system installed therein, and wherein said databus system and at least some components of said operating and control arrangement are elements of said cabin intercommunication data system.

3. The improvement in the aircraft according to claim 1, wherein said databus system is a hardwired databus system.

4. The improvement in the aircraft according to claim 1, wherein said databus system is a wireless data transmission system.

5. The improvement in the aircraft according to claim 1, wherein said information input devices comprise at least two different devices selected from the group consisting of a data storage device, a first data interface adapted to receive off-board data wirelessly transmitted to said aircraft, and a second data interface adapted to receive on-board data from an avionics system of said aircraft.

6. The improvement in the aircraft according to claim 5, wherein said information input devices comprise at least one said data storage device, which is selected from the group consisting of CD-ROMS, memory cards, diskettes, and USB storage devices.

7. The improvement in the aircraft according to claim 5, wherein said information input devices comprise at least one said first data interface, which is selected from the group consisting of wireless receiver interfaces for receiving wireless transmissions from the earth to the aircraft and wireless receiver interfaces for receiving satellite transmissions to the aircraft.

8. The improvement in the aircraft according to claim 1, wherein said operating and control arrangement comprises a computer processing and operating unit as well as at least one of an integrated operator input panel and/or an externally connected peripheral keyboard.

9. The improvement in the aircraft according to claim 1, wherein said operating and control arrangement comprises a monitoring and control unit and a computer processing and operating unit that are integrated together in a single device unit.

10. The improvement in the aircraft according to claim 1, wherein said passenger service unit further includes, integrated therein, a fixed invariable passenger instructional sign arranged in or on said unit housing in addition to said universal notification display.

11. The improvement in the aircraft according to claim 1, wherein said universal notification display is further adapted to display a fixed invariable passenger instructional message text or graphic image.

* * * * *